United States Patent [19]

Kerry et al.

[11] Patent Number: 5,457,763
[45] Date of Patent: Oct. 10, 1995

[54] OPTICAL FIBER SPLICE ORGANIZER

[75] Inventors: John Kerry; Peter L. J. Frost, both of Ipswich; Robert A. Freeman, Rushmere Park, all of England

[73] Assignee: British Telecommunications public limited company, London, England

[21] Appl. No.: 820,629
[22] PCT Filed: Jun. 1, 1990
[86] PCT No.: PCT/GB90/00857
§ 371 Date: Jan. 24, 1992
§ 102(e) Date: Jan. 24, 1992
[87] PCT Pub. No.: WO90/15351
PCT Pub. Date: Dec. 13, 1990

[30] Foreign Application Priority Data

Jun. 2, 1989 [GB] United Kingdom ............ 8912767

[51] Int. Cl.⁶ .................................................. G02B 6/36
[52] U.S. Cl. .......................................... 385/135; 385/134
[58] Field of Search ............................ 385/134, 135, 385/147

[56] References Cited

U.S. PATENT DOCUMENTS

| | | | |
|---|---|---|---|
| 4,840,449 | 6/1989 | Ghandeharizadeh | 385/135 |
| 5,066,149 | 11/1991 | Wheeler et al. | 385/135 |
| 5,067,784 | 11/1991 | Debortoli et al. | 385/135 |
| 5,249,252 | 9/1993 | Noto | 385/135 |
| 5,319,732 | 6/1994 | Jones | 385/135 |

FOREIGN PATENT DOCUMENTS

| | | | |
|---|---|---|---|
| 0178179 | 4/1986 | European Pat. Off. | 385/135 X |
| 0215668 | 3/1987 | European Pat. Off. | 385/135 X |
| 2176907 | 1/1987 | United Kingdom | 385/135 X |

*Primary Examiner*—Brian Healy
*Attorney, Agent, or Firm*—Nixon & Vanderhye

[57] ABSTRACT

A splice organiser comprises a tray having a plurality of formers (14, 15) which control the minimum bend radius of the fibres, a groove for retaining a splice, an enclosure into which coiled fibre loops are introduced and permitted to expand so that they are retained by the resilience of the fibre itself, and a plurality of guide tracks (23, 24, 25) which enable fibres to enter and exit the organiser at any corner of the tray.

12 Claims, 2 Drawing Sheets

OPTICAL FIBER SPLICE ORGANIZER

BACKGROUND OF THE INVENTION

This invention relates to optical fibre distribution and in particular but not exclusively to branched networks for optical telecommunications.

Presently optical fibres are utilised in trunk lines for telecommunications but it is desirable to have optical transmission within other points in a network, such as in branches between an exchange and a subscriber. Elements in such branches need to be reliable under the extremes of ambient temperature and to permit broad spectrum transmission over the range of wavelengths utilised, at present usually 1300 to 1550 nm. It is also necessary to ensure that minimum losses occur due to macrobending as optical fibres emerge from branching elements such as couplers.

Our co-pending British application No. 8827348.7 describes an optical fibre distribution arrangement comprising a coupling array and a splice organiser associated with each input and output line of the coupling array, the splice organisers being mounted to a supporting frame and capable of limited relative movement with respect to one another so as to permit access to the splices stored therein. A splice organiser described in the application comprises a tray having a groove for retaining a splice and recesses for confining loops of optical fibre under their own natural resilience. In this splice tray there is only one entry/exit port for the fibre, which port is located at one corner. However, in some instances it would be preferable to be able to have a choice of entry and/or exit port from a number of alternatives. In this case it is desirable that means be provided for the fibre to be routed to the alternative entry/exit ports in such a way that significant optical loss from the fibre due to macrobending is avoided. It is additionally desirable that there are a number of alternative routes to each alternative entry/exit port.

SUMMARY OF THE INVENTION

The present invention provides a splice organiser comprising a tray having a plurality of formers to define the minimum bend radius of optical fibres so that significant optical loss from the fibres is avoided, a groove for retaining a splice, and at least one recess for confining loops of optical fibre under their own natural resilience, the or each recess being positioned between a respective pair of adjacent formers and being sized and shaped to confine loops of optical fibre having radii of curvature exceeding the minimum bend radius, and in which a plurality of guide tracks are provided to enable fibres to enter or exit the organiser at any one of a plurality of ports.

BRIEF DESCRIPTION OF THE DRAWINGS

The invention is now described by way of example with reference to the accompanying drawings in which:

FIG. 2B is a cross-sectional view of the feature shown in FIG. 2A; and

DETAILED DESCRIPTION OF THE INVENTION

Figure 1:
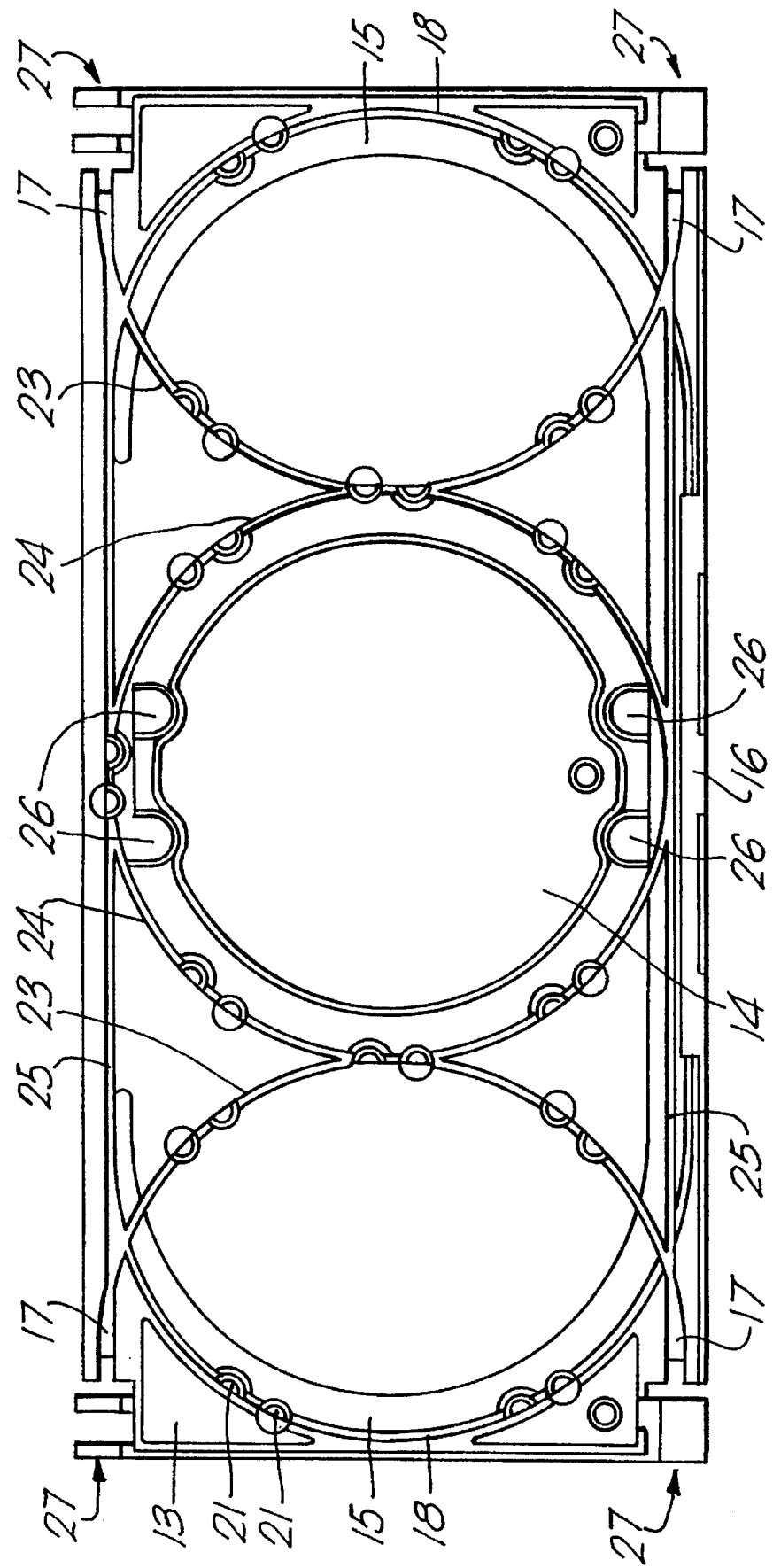
FIG. 1 is a side view of a preferred embodiment of a splice organiser according to the invention.

FIG. 1 shows a preferred splice organiser which enables a single splice 16 to be stored on one side of an organiser and fibre to enter or exit the organiser at any one of the four entry/exit ports 27 located at the four corners of the tray. The organiser comprises a tray 13 having a central raised, substantially circular former 14, and two raised curved end formers 15, the splice 16 being positioned in a splice retaining groove located, as shown, on a long side of the organiser. The fibres enter and pass out of the organiser along any one of separate channels 17 which lead to each of the four corners of the tray. Spare loops of fibre on each side of the splice are stored in the organiser by forming coils of fibre and placing these over the former 14 after passing the first bend after the splice around the outer side of the curved end former 15. Alternative winding patterns around both the end formers or over one end former and the opposite side of the central former may also be used, but several turns should preferably be placed over the central former, and it is preferable to have a single length of fibre close to the splice passing along a separate channel.

The natural resilience of the fibres will cause the coils placed over the central former to expand outwardly into a configuration of varying diameter turns. This procedure is then repeated for the fibre on the other side of the splice. Care has to be taken not to coil the fibres over-tightly in the first instance. In the situation where only the first bend of the fibre after the splice has been passed around the outer side of the curved former, or another channel is provided, the organiser presents a separate track 18 to facilitate non-destructive testing eg via 'Clip-On' (Trade Mark) access technology, see PCT patent application WO 88/07689, should it be necessary for any reason to gain access to the data transmission along the fibre. A route map may be used to determine on which side of the splice the fibre is to be tested, and a suitable tool may be used for lifting the fibre out of the track. This arrangement ensures that access is gained at a point on the fibre relatively close to the splice, so that if the fibre is in any way damaged by the action of gaining 'Clip-On' access, it is simple to discard the damaged length of fibre, adjust the spare coils, and form a new splice without losing much fibre, thus avoiding the possibly serious mistake of damaging and having to discard a much longer portion of the spare fibre.

Each of the channels 17 is connected to a recessed semicircular track 23 which extends between the two channels 17 at each short end of the organiser. The tracks 23 touch further recessed semicircular tracks 24 at their mutual mid points. Recessed longitudinal tracks 25 extend between the channels 17 disposed along the same long side of the organiser. With this arrangement a fibre in the organiser can be routed to or from any channel 17. For example consider a fibre, wound clockwise as viewed around the central former 14. This fibre may be routed tangentially from the former 14 along the tracks 25 to exit via either the top right or bottom left (as viewed) channel 17. Alternatively the fibre may be guided into one of tracks 24 and then diverted into the intersecting track 23, the fibre undergoing an inflexion, to exit at the bottom right or top left channel 17. Corresponding entry routes apply, and analogous routing for anti-clockwise wound fibre is also possible. The fibres to be spliced are routed through the organiser by laying them in the recessed tracks in a suitable route from the chosen entrance, via the splice 16, to the chosen exit of the organiser; the spare loops of fibre then being coiled up and laid over the central former 14, thus overlying the fibres in the recessed tracks.

Each of the recessed tracks 23, 24 and 25, may have small tabs or clips 21 which retain the fibre in the track. Larger clips 26 may also be provided to retain the spare loops of fibre around the central former 14.

Figure 2A:
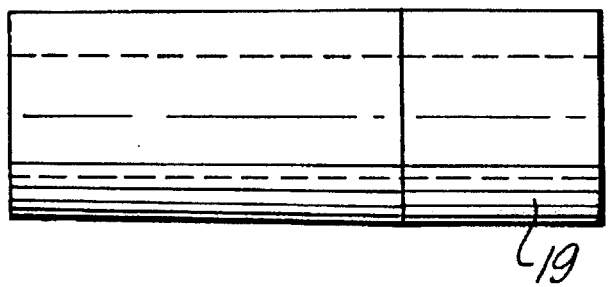
FIG. 2A shows a detail of one feature of the preferred embodiment.
Figure 2A:
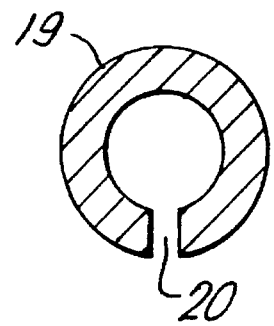

At each corner of the splice organiser the channels 17 are connected to short lengths of tube 19 which fit through holes 27 in the tray 13. These tubes are shown in FIG. 2A, which shows a side view of a tube 19, and in FIG. 2B, which shows a cross-sectional view of the tube. Each tube is formed with a longitudinal slit 20, and a longitudinal taper of the order of half a degree along at least part of its length, which is provided for ease of removing the tubes from their mould during manufacture. Capillaries for supporting the fibres are then passed through the tube before the tube is pushed into a hole 27 at one corner of the tray. These holes have a slightly smaller diameter than that of the tubes so that the slit 20 is forced to close, and the final circumferences of the tube and the hole match when the tube is pushed in until the tube abuts the end of channel 17.

Figure 3:
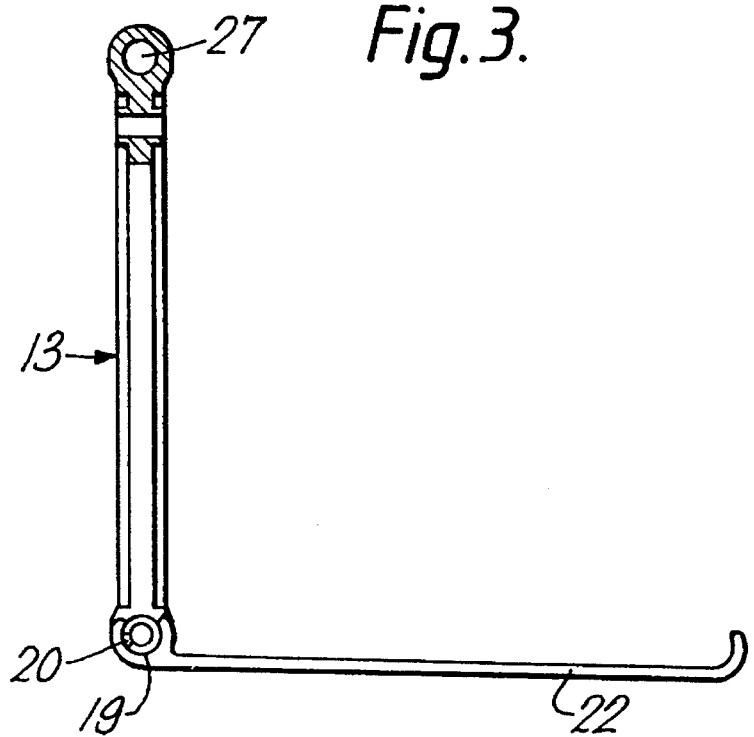
FIG. 3 shows a further feature of the preferred embodiment.

The tubes 19 consitutute hinge pins, by which means the splice organisers 2 can be pivotally mounted on a supporting frame (not shown). Furthermore, as shown in FIG. 3, a hinged or clip-on lid 22 may be provided to cover the organiser, the lid pivoting on the tubes 19, or the organiser may be arranged to co-operatively engage with an adjacent organiser so that the confronting organisers effectively form covers for each other. The reverse side of the organiser preferably has a similar or identical configuration for storing another splice and associated fibre.

A plurality of the preferred splice organisers may be mounted to a supporting frame so as to be capable of limited relative movement with respect to one another and hence permit access to the splices stored therein.

By way of example the dimensions for a preferred embodiment of the splice organiser will now be given. The overall dimensions are approximately 172 mm long by 78 mm wide, referring to FIG. 1, and 8 mm deep, referring to FIG. 3. The central former 14 is about 60 mm in diameter, hence defining a minimum bend radius for primary coated optical fibre which prevents significant optical loss, due to macrobending, from the fibre when it is positioned around the former. The guide tracks 18, 23, 24 and 25 are approximately 1 mm wide and vary in depth from about 1 mm to about 2 mm . The curved tracks 18, 23 and 24 have a radius of curvature of 35 mm again chosen to avoid optical loss from the optical fibres due to macrobending.

The splice retaining groove 16 is about 2.4 mm wide and about 70 mm long to give a snug fit for a conventional heat shrink protected fibre splice.

The tube 19 has an outer diameter of about 1 mm and an inner diameter of about 0.5 mm. The face of the splice tray shown in FIG. 1 is substantially planar to enable adjacent trays to be stacked closely together without wasted space. Typically a tray will have a bow over its whole length of less than about 0.5 mm.

The splice tray 13 is preferably moulded from acrylonitrile butadiene styrene (ABS). The tubes 19 are constructed from polyvinylidene fluoride (PVDF) and the lid 22 is formed from a clear polymer such as an acrylic resin.

We claim:

1. A splice organiser comprising:

a tray having a plurality of entrance/exit ports, a plurality of fibre guide means to define the minimum bend radius of optical fibres so that significant optical loss from the fibres is avoided, a groove for retaining a splice, and at least one recess area for confining loops of optical fibre under their own natural resilience, the or each recess area being positioned between a respective pair of adjacent fibre guide means and being sized to occupy substantially at least as much area as would be encompassed by a complete loop of minimum bend radius optical fibre and shaped to confine loops of optical fibre having radii of curvature exceeding the minimum bend radius, and a plurality of guide tracks being provided to enable fibres to enter or exit the organiser at any one of said plurality of ports, portions of said guide tracks being constituted by recessed tracks formed in the or each said recess area.

2. A splice organiser as claimed in claim 1, wherein the minimum radius of curvature of the guide tracks is such as to avoid significant optical loss in fibres in the guide tracks.

3. A splice organiser comprising:

a tray having a plurality of fibre guide means to define the minimum bend radius of optical fibres so that significant optical loss from the fibres is avoided, a groove for retaining a splice, and at least one recess for confining loops of optical fibre under their own natural resilience, the or each recess being positioned between a respective pair of adjacent fibre guide means and being sized and shaped to confine loops of optical fibre having radii of curvature exceeding the minimum bend radius, and in which a plurality of guide tracks are provided to enable fibres to enter or exit the organiser at any one of a plurality of ports, wherein at least one port is provided at each corner of the tray.

4. A splice organiser comprising:

a tray having a plurality of fibre guide means to define the minimum bend radius of optical fibres so that significant optical loss from the fibres is avoided, a groove for retaining a splice, and at least one recess for confining loops of optical fibre under their own natural resilience, the or each recess being positioned between a respective pair of adjacent fibre guide means and being sized and shaped to confine loops of optical fibre having radii of curvature exceeding the minimum bend radius, and in which a plurality of guide tracks are provided to enable fibres to enter or exit the organiser at any one of a plurality of ports, wherein the organiser is provided with a substantially central, circular fibre guide means and a pair of curved end fibre guide means, a respective recess being positioned between the central fibre guide means and each of the end fibre guide means.

5. A splice organiser as claimed in claim 4, wherein the splice-retaining groove is positioned adjacent to the central fibre guide means, and wherein one loop of the fibre on either side of the splice is passed separately round a respective one of the end fibre guide means.

6. A splice organiser comprising:

a tray having a plurality of entrance/exit ports, a plurality of fibre guide means to define the minimum bend radius of optical fibres so that significant optical loss from the fibres is avoided, a groove for retaining a splice, and at least one recess area for confining loops of optical fibre under their own natural resilience, the or each recess area being positioned between a respective pair of adjacent fibre guide means and being sized to occupy substantially at least as much area as would be encompassed by a complete loop of minimum bend radius optical fibre and shaped to confine loops of optical fibre having radii of curvature exceeding the minimum bend radius, a plurality of guide tracks being provided to enable fibres to enter or exit the organiser at any one of said plurality of ports, and wherein tubes fitted at corners of the tray constitute hinge pins by which the splice organiser can be pivotally mounted to a frame, and the tubes accommodate capillary tubes for conducting fibres into the splice organiser.

7. A splice organiser as claimed in claim 6, wherein the tubes form means whereby a hinged or clip-on lid may be fitted to the splice organiser.

8. An optical fibre splice organiser comprising a tray having:

at least three fibre entrance/exit ports;

a groove for retaining a splice between optical fibre ends;

a central relatively raised area having an outer radius of curvature no less than the minimum bend radius of optical fibres so that significant optical loss from fibre bending is avoided when an excess length of said fibre ends is wrapped therearound;

at least one relatively raised end area spaced from said central area and having an inside radius of curvature no less than said minimum bend radius such that said excess of said fibre ends is located about said central area and within said end area(s) and permitted to expand under its own resilience into loops of a substantial range of different sizes thus accommodating a continuous range of excess fibre lengths; and recessed guide tracks disposed between said central area and said end area(s) and leading to/from said entrance/exit ports.

9. A splice organiser as in claim 8 wherein said recessed guide tracks also extend to/from said groove for the splice.

10. A splice organiser as in claim 8 wherein two of said raised end areas bracket said raised central area and are each spaced therefrom by an interposed area that is at least as large as said central area.

11. A splice organiser as in claim 10 wherein said tray is of rectangular shape having at least one of said entrance/exit ports at each of its four corners.

12. A splice organiser as in claim 8 wherein said raised end area(s) also has (have) an outer radius of curvature no less than said minimum bend radius and wherein said recessed guide tracks extend around the outer portion of the raised end area(s).

* * * * *